(12) United States Patent
Sargeant et al.

(10) Patent No.: US 10,662,311 B2
(45) Date of Patent: May 26, 2020

(54) THERMOPLASTIC FILMS HAVING ASYMMETRIC PROPERTIES

(71) Applicant: Flex Films (USA) Inc., Elizabethtown, KY (US)

(72) Inventors: Steven Sargeant, Elizabethtown, KY (US); Sudhir Naik, Noida (IN); J. K. Sharma, Noida (IN); Pramod Sirsamkar, Noida (IN)

(73) Assignee: FLEX FILMS (USA) INC., Elizabethtown, KY (US)

( * ) Notice: Subject to any disclaimer, the term of this patent is extended or adjusted under 35 U.S.C. 154(b) by 191 days.

(21) Appl. No.: 14/989,592

(22) Filed: Jan. 6, 2016

(65) Prior Publication Data

US 2016/0193821 A1 Jul. 7, 2016

Related U.S. Application Data

(60) Provisional application No. 62/100,197, filed on Jan. 6, 2015.

(51) Int. Cl.
 *C08K 3/36* (2006.01)
 *B32B 27/36* (2006.01)
 (Continued)

(52) U.S. Cl.
 CPC ............ *C08K 3/36* (2013.01); *B29C 48/0018* (2019.02); *B29C 48/0021* (2019.02); *B29C 55/023* (2013.01); *B29D 7/01* (2013.01); *B32B 27/08* (2013.01); *B32B 27/20* (2013.01); *B32B 27/36* (2013.01); *C08J 5/18* (2013.01);
 (Continued)

(58) Field of Classification Search
 CPC ............... B29C 55/143; B29C 55/146; B29K 2067/003; B32B 2307/518; B32B 2307/54; B32B 2307/5825; B32B 2367/00
 See application file for complete search history.

(56) References Cited

U.S. PATENT DOCUMENTS

| 3,579,609 A | 5/1971 | Sevenich |
| 3,640,944 A | 2/1972 | Benz et al. |

(Continued)

FOREIGN PATENT DOCUMENTS

| JP | 2001-225384 A | | 8/2001 |
| JP | 2001225384 A | * | 8/2001 |
| KR | 10-2014-0120022 A | | 10/2014 |

OTHER PUBLICATIONS

Asada et al, JP2001-225384A translation, Aug. 21, 2001 (Year: 2001).*

(Continued)

*Primary Examiner* — Scott R. Walshon
*Assistant Examiner* — Jasper Saberi
(74) *Attorney, Agent, or Firm* — Birch, Stewart, Kolasch & Birch, LLP (57) ABSTRACT

A thermoplastic film is provided that includes a biaxially-oriented polyethylene terephthalate (PET) layer, a tensile strength in the longitudinal and transverse directions of about 2000 kg/cm$^2$ or 3000 kg/cm$^2$ or more, and a tear force in the longitudinal direction that is about 1.5 times as large as a tear force in the transverse direction. Such a film can include two or more layers. Processes for producing the thermoplastic film are also provided.

21 Claims, 2 Drawing Sheets

(51) Int. Cl.

| | | |
|---|---|---|
| *B32B 27/08* | (2006.01) | |
| *C08J 5/18* | (2006.01) | |
| *B29C 55/02* | (2006.01) | |
| *B29D 7/01* | (2006.01) | |
| *B32B 27/20* | (2006.01) | |
| *B29C 48/00* | (2019.01) | |
| *C08J 7/04* | (2020.01) | |
| *B32B 38/00* | (2006.01) | |
| *B29K 67/00* | (2006.01) | |
| *B29C 55/14* | (2006.01) | |

(52) U.S. Cl.
CPC ........... *C08J 7/0427* (2020.01); *B29C 55/143* (2013.01); *B29K 2067/003* (2013.01); *B32B 2038/0028* (2013.01); *B32B 2255/10* (2013.01); *B32B 2255/26* (2013.01); *B32B 2264/102* (2013.01); *B32B 2270/00* (2013.01); *B32B 2307/518* (2013.01); *B32B 2307/54* (2013.01); *B32B 2307/5825* (2013.01); *B32B 2307/702* (2013.01); *B32B 2307/704* (2013.01); *B32B 2307/732* (2013.01); *B32B 2367/00* (2013.01); *C08J 2367/02* (2013.01); *C08J 2433/00* (2013.01); *C08J 2475/04* (2013.01)

(56) References Cited

U.S. PATENT DOCUMENTS

| | | | |
|---|---|---|---|
| 3,944,699 A | | 3/1976 | Mathews et al. |
| 4,059,667 A | | 11/1977 | Pangonis |
| 4,546,030 A | | 10/1985 | Minami et al. |
| 5,154,682 A | * | 10/1992 | Kellerman ........... A43B 1/0072 36/178 |
| 6,060,137 A | * | 5/2000 | Akao ...................... B32B 27/08 428/35.2 |
| 6,303,228 B1 | * | 10/2001 | Watanabe ................. B41M 5/41 428/423.7 |
| 6,589,463 B1 | | 7/2003 | Vogt et al. |
| 6,984,322 B2 | | 1/2006 | Suh et al. |
| 8,236,399 B2 | | 8/2012 | Chicarella et al. |
| 8,399,080 B2 | | 3/2013 | Chicarella et al. |
| 2009/0304997 A1 | * | 12/2009 | Haruta ....................... C08J 5/18 428/156 |
| 2011/0028677 A1 | | 2/2011 | Mohanty et al. |
| 2012/0100363 A1 | * | 4/2012 | Yamamoto ........... B29C 55/005 428/319.1 |
| 2014/0113132 A1 | * | 4/2014 | Sakellarides ............ B41J 31/04 428/354 |
| 2014/0186606 A1 | * | 7/2014 | Bower .................. B29C 55/143 428/220 |
| 2015/0004387 A1 | | 1/2015 | Sargeant et al. |

OTHER PUBLICATIONS

JP2001225384A human translation (Year: 2001).*
S.K. Sharma and A. Misra, "The Effect of Stretching Conditions on Properties of Amorphous Polyethylene Terephthalate Film," J. Applied Polymer Science vol. 34 2231-2247 1987.
Korean Intellectual Property Office, International Search Report issued in corresponding Application No. PCT/US2016/012353, dated May 13, 2016.
Extended European Search Report for Application No. 16735364.8, dated Aug. 20, 2018.

* cited by examiner

THERMOPLASTIC FILMS HAVING ASYMMETRIC PROPERTIES

RELATED APPLICATIONS

This application claims priority from U.S. Provisional Application Ser. No. 62/100,197, filed Jan. 6, 2015, the entire disclosure of which is incorporated herein by this reference.

TECHNICAL FIELD

The presently-disclosed subject matter relates to films having asymmetric properties and processes for producing the same. In particular, the presently-disclosed subject matter relates to thermoplastic, biaxially-oriented polyethylene terephthalate films that have a tear force in the longitudinal direction that is about 1.5 times as large as a tear force in the transverse direction.

BACKGROUND

Thermoplastic films are known in the art and can be manufactured from semicrystalline resins such as polyethylene terephthalate (PET), polyethylene, cycloolefin copolymers, ethylene vinyl alcohol copolymers, nylons, polylactic acids, polypropylene, polyphenylene sulphate, and other materials. Moreover, it is appreciated that a number of thin polymer films can be prepared commercially with processes that involve sequential melting, extrusion, and solidification of the polymer material into a thin cross-section. Orientation of such polymer films through blowing or mechanical methods in the longitudinal (machine) and transverse directions can significantly increase the crystallinity of the films, which can, in turn, affect tear, twist, optical, and other mechanical properties of films.

In this regard, it is further appreciated that the amorphous content of any PET film is the weight fraction of material that is not crystallized within the biaxial orientation process, and that the densification of the amorphous phase implies that the mass per unit volume of non-crystalline material is increased (see, e.g., Polymer Bulletin, April 1988, Volume 19, Issue 4, pp. 397-401, the entire contents of which are incorporated herein by this reference). The semicrystalline nature of oriented polymer films implies a weight fraction of such film is crystalline, whereas the remaining portion of the material is amorphous. The ratio of crystalline to amorphous domains is strongly influential for properties like gas barrier properties, thermal resistance, density, optical clarity, and other commercially-valuable properties.

With further respect to the structure of oriented polymer films, including PET films, some have suggested that the nodular structure and small isometric crystallites within biaxially-oriented PET film may contribute to PET film ductility at low temperatures (see Klement and Geil, Journal of Macromolecular Science, Part B: Physics Volume 5, Issue 3, 1971, the entire contents of which are incorporated herein by this reference). Such morphological attributes can be introduced and controlled through process conditions including stretching ratios, speed of stretching, temperature of stretching, crystallization temperatures, and the like.

U.S. Pat. Nos. 4,786,533; 4,842,187; 5,292,563; 5,451,455; and 5,573,723 as well as European Patent No. 0441027, which are incorporated herein by reference, describe various formulations and attributes for polyolefin twistable films, where, in general, the modulus of the film is lowered to allow deformation of the film under relatively low stress conditions. More specifically, these patents describe the use of additives to change the modulus properties of biaxially-oriented polyolefin films, as a lower modulus allows the films to twist with little recovery, as well as tear more easily.

Despite the properties observed with those films, however, the construction of films with low modulus properties presents many challenges in the commercial environment. Maintaining low modulus from the inclusion of low molecular weight additives like oils, tackifiers, and plasticizers can result in problems of migration of the low molecular weight additives, which can then result in additional issues related to obtaining food contact approval status and to processing troubles. Surface properties like coefficient of friction (COF) and heat sealability can also be compromised as a function of time in films that include such additives. Furthermore, it can be difficult or impossible to metalize low modulus films of this type of construction due to problems associated with the relatively high vapor pressures of oils and other small molecules under vacuum metalizing chamber conditions.

Other known methods for providing thermoplastic materials with good twist or tear properties have involved making such films at relatively low orientation ratios. However, the construction of low stretch ratio films can be problematic due to the likelihood of high shrinkage during subsequent use of the films as well as poor commercial runability of the films. Such shrinkage would be further exacerbated as temperatures increased.

Accordingly, there remains a need in the art to produce a thermoplastic PET film with easy twist and tear properties without the requirement of using low molecular weight additives or low stretch ratios to construct the material. Such films and processes would be desirable and beneficial for a range of commercial applications including, but not limited to, the packaging of food, candy, novelties, and other commodities.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of such features.

The presently-disclosed subject matter includes thermoplastic polyethylene terephthalate films and processes for producing the same. In particular, the presently-disclosed subject matter includes thermoplastic polyethylene terephthalate films having a biaxially-oriented polyethylene terephthalate layer, a tensile strength in the longitudinal direction of about 2000 kg/cm$^2$ or more, a tensile strength in the transverse direction of about 3000 kg/cm$^2$ or more, and a tear force in the longitudinal direction that is about 1.5 times as large as a tear force in the transverse direction. With respect to the polyethylene terephthalate, the polyethylene terephthalate used for the films can be selected from a polyethylene terephthalate homopolymer, a polyethylene terephthalate copolymer, and a combination thereof.

Regardless of whether the PET layer includes PET homopolymers or copolymers, the PET layer included in the films of the presently-disclosed subject matter is generally prepared by processes known to those of ordinary skill in the art including the use of conventional sequential biaxial orientation machines having a single screw mainline extrusion train and a twin screw sub-extrusion process. In this regard, in some embodiments, standard PET pellets having a desired intrinsic viscosity can be fed into the main extrusion line, while a blend of standard PET pellets and PET pellets having a different composition (e.g., PET pellets including an inorganic additive) can be fed in to the sub-extrusion process, such that the materials can be melted separately and then laminated together in a feed-block to produce a desired molten structure (e.g., an A/B/A molten structure) in an extrusion die. The laminated PET material or layer emerging from the extrusion die can then be quenched on a chilled casting drum to produce a thick, amorphous film structure. The PET layer is then preferably stretched about 2 to about 5 times in the machine, or longitudinal, direction and, after the acrylic primer coating process described below, about 2 to about 5 times in the transverse direction, followed by heat crystallization. In some embodiments, after stretching the PET layer in the longitudinal and transverse direction and crystallization, a layer of PET material is obtained having a tensile strength of at least about 2000 kg/cm$^2$ or 3000 kg/cm$^2$ in both the transverse and the longitudinal direction of the film, and having dimensions that are about 2 to about 4.5 times those originally found in the PET layer in both the longitudinal and transverse direction. In some embodiments, the resulting PET layer has a total thickness of about 6 μm to about 9 μm.

Some embodiments of the presently-described films are multilayer films that comprise two or more layers, and in some instances include three layers. Some embodiments of the multilayer films comprise one or more layers that include silica. In some embodiments, silica is added to a layer, such that the resulting film has a dynamic coefficient of friction (COF) to steel of less than about 0.45 or, in some embodiments, of less than about 0.45 μD to steel when heated to 150° C. In some embodiments, silica is added to one or more layers comprised of polyethylene terephthalate to thereby form a polyethylene terephthalate-silica layer, which can be formed, for example, in the sub-extrusion process described herein. In certain embodiments, the films have a three-layer "AB/A" structure that includes, from top to bottom, a first polyethylene terephthalate layer, a polyethylene terephthalate-silica layer, and a second polyethylene terephthalate layer. In some embodiments, the films have a total thickness of about 50 μm or less. In some embodiments, the films have a total thickness of about 30 μm or less. In some embodiments, the films have a total thickness of about 5 μm to about 15 μm.

Further provided by the presently-disclosed subject matter are processes for producing a thermoplastic film with asymmetric properties. In some embodiments, a process for producing a thermoplastic film is provided wherein a biaxially-oriented polyethylene terephthalate layer is first produced by melting an amount of polyethylene terephthalate pellets to form an initial polyethylene terephthalate layer. Next, a biaxially-oriented polyethylene terephthalate layer that includes silica is produced by melting together an amount of polyethylene terephthalate pellets and silica. The polyethylene terephthalate layer can then be laminated on to one or both sides of the polyethylene terephthalate layer that includes silica, the co-extruded layer, to thereby produce a multilayer film.

Subsequently, in some embodiments, the multilayer film is first stretched in a longitudinal direction, and then the multilayer film is stretched in a transverse direction. The step of stretching the multilayer film in the longitudinal direction includes, in some embodiments, stretching the multilayer film by a factor of about 2 to about 4. The step of stretching the multilayer film in the transverse direction includes, in some embodiments, stretching the multilayer film by a factor of about 3 to about 4.5. In some embodiments, the step of stretching the multilayer film in the transverse direction is performed at a temperature of about 80° C. to about 140° C.

Optionally, after the step of stretching the multilayer film in a longitudinal direction and prior to the step of stretching the multilayer film in the transverse direction, at least one side of the multilayer film layer is coated, such as with a cross-linked acrylic primer. In some embodiments, coating the multilayer film comprises inline coating the multilayer film.

Further features and advantages of the presently-disclosed subject matter will become evident to those of ordinary skill in the art after a study of the description, figures, and non-limiting examples in this document.

DESCRIPTION OF EXEMPLARY EMBODIMENTS

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a," "an," and "the" refer to "one or more" when used in this application, including the claims. Moreover, unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method. Additionally, as used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The presently-disclosed subject matter includes films having asymmetric properties as well as processes for producing the same. In particular, the presently-disclosed subject matter includes, in some embodiments, thermoplastic, biaxially-oriented polyethylene terephthalate (PET) films that have a tear force in the longitudinal (machine) direction that is about 1.5 times as large as a tear force in the transverse direction.

In some embodiments of the presently-disclosed subject matter, a thermoplastic film is provided that comprises a biaxially-oriented polyethylene terephthalate layer having asymmetric properties. The term "thermoplastic" is used herein to refer to a material that generally is capable of being repeatedly hardened when cooled and softened when heated. In some embodiments, by virtue of the thermoplastic films having asymmetric properties, the films are characterized in both a longitudinal direction, or the direction that the film moves in during the manufacturing process, and in a transverse direction, which is perpendicular to the longitudinal direction. In this respect, in some embodiments, the thermoplastic films comprise a tensile strength in the longitudinal direction of about 2000 kg/cm$^2$ or more, including about 2000 kg/cm$^2$ to about 10,000 kg/cm$^2$. In some embodiments, the thermoplastic films further comprise a tensile strength in the transverse direction of about 3000 kg/cm$^2$ or more, including about 3000 kg/cm$^2$ to about 10,000 kg/cm$^2$.

In some embodiments, the polyethylene terephthalate layer included in the thermoplastic films comprises polyethylene terephthalate homopolymers, where the polyethylene terephthalate layer consists of only polyethylene terephthalate. Additionally or alternatively, other embodiments of the present thermoplastic films include a polyethylene terephthalate layer that comprises polyethylene terephthalate copolymers, wherein the polyethylene terephthalate layer includes polyethylene terephthalate and one or more additional co-monomers. Additional co-monomers that can be used in this regard include, but are not limited to, diethylene glycol, propylene glycol, neopentyl glycol and polyalkylene glycols, 1,4-butane diol, 1,3-propane diol, dicarboxylic acids such as adipic acid, sebacic acid, malonic acid, succinic acid, isophthalic acid, and 2,6-napthalenedicarboxylic acid.

Regardless of whether the polyethylene terephthalate layer includes polyethylene terephthalate homopolymers or copolymers, the polyethylene terephthalate layer included in the films of the presently-disclosed subject matter is generally prepared by processes known to those of ordinary skill in the art including the use of conventional sequential biaxial orientation machines having a single screw mainline extrusion train and a twin screw sub-extrusion process. In this regard, in some embodiments, standard polyethylene terephthalate pellets having a desired intrinsic viscosity can be fed into the main extrusion line, while pellets of another composition can be fed into a sub-extrusion process. For instance, a blend of standard polyethylene terephthalate pellets and silica-filled polyethylene terephthalate pellets can be fed in to the sub-extrusion process. The materials can then be melted separately and laminated together in a feed-block to produce a desired multilayer molten structure (e.g., an A/B/A molten structure) in an extrusion die.

Through laminating the various layers of materials together, in some embodiments, the thermoplastic films described herein can thus be comprised of a plurality of layers or in other words can comprise a "multilayer film" having two or more layers that can differ in composition and/or physical properties. In certain embodiments, the thermoplastic films comprise three layers (e.g., an A/B/A configuration). Additionally, in some embodiments at least one of the layers in an exemplary multilayer film includes silica. In some embodiments, exemplary multilayer films comprise a layer that includes silica interposed between layers that do not include silica. In some embodiments, the multilayer film comprises, from top to bottom, a first polyethylene terephthalate layer, a polyethylene terephthalate-silica layer, and a second polyethylene terephthalate layer.

Regardless of the particular multi-layer structure included in a thermoplastic film of the present invention, once the materials and/or various layers are melted and laminated together, the laminated polyethylene terephthalate material or layer emerging from the extrusion die is generally subsequently quenched on a chilled casting drum to produce a thick, amorphous film structure. The thermoplastic film is then stretched about 2 to about 5 times in the longitudinal direction. In some embodiments, the step of stretching the multilayer film in the longitudinal direction includes stretching the multilayer film by a factor of about 2 to about 4. After stretching in the longitudinal direction, the film is then stretched about 2 to about 5 times in the transverse direction. In some embodiments, the step of stretching the multilayer film in the transverse direction includes stretching the multilayer film by a factor of about 3 to about 4.5.

The thickness of the resulting films can depend on a variety of factors, including, but not limited to, the number of layers in the film, the thickness of the individual layers, the stretching ratio, and the like. In some embodiments, by stretching the resulting film in the above-described manner, the film has a total thickness of about 100 µm or less, a total thickness of about 70 µm or less, a total thickness of about 50 µm or less, a total thickness of about 30 µm or less, or a total thickness of about 10 µm or less. In some embodiments, the film has a total thickness of about 5 µm to about 50 µm, including about 5 µm, 10 µm, 15 µm, 20 µm, 25 µm, 30 µm, 35 µm, 40 µm, 45 µm, and 50 µm.

Additionally, in some embodiments and to produce a film having asymmetric properties, stretching in the transverse direction is performed at a temperature of about 80° C. to about 140° C., including, in some embodiments, about 70° C., about 80° C., about 90° C., about 100° C., about 110° C., about 120° C., about 130° C., and about 140° C. In some embodiments, and without being bound by theory or mechanism, the presently-disclosed subject matter provides thermoplastic films and processes for producing the same that utilize the orientation of the thermoplastic films as well as other parameters to tune the tear properties of the films. Specifically, and again without wishing to be bound by any particular theory or mechanism, it is believed that by first longitudinally stretching the films at higher temperatures, such as those that would normally be used in the stretching of PET films in the longitudinal direction, and then subsequently stretching the films in a transverse direction at lower temperatures than what would normally be used in the manufacture of PET films, the films of the presently-disclosed subject matter are allowed to anneal at a much lower temperature than what would typically be observed. In turn, such annealing at lower temperatures then leads to an absence of or a reduced amount of crystallinity in the transverse direction of the film and, consequently, leads to a thermoplastic film having different properties in the longitudinal and the transverse directions of the film or, in other words, a thermoplastic film having "asymmetric" properties.

For example, in some embodiments of the presently-disclosed subject matter, by stretching a film of the presently-disclosed subject matter in the longitudinal direction at standard temperatures and subsequently stretching the film in the transverse direction at lower temperatures than what is commonly observed in the manufacturing of PET films, the resulting thermoplastic film includes a tear force in the longitudinal direction that differs from the tear force in the transverse direction. The term "tear force" as used herein refers to the force required to move a tear through a material in a particular direction, but that excludes the force required to initiate a tear in a material, or to completely separate a material into two respective pieces. In certain embodiments of the presently-disclosed thermoplastic films, the thermoplastic films comprise a tear force in the longitudinal direction that is about 1.1, about 1.2, about 1.3, about 1.4, about 1.5, about 1.6, about 1.7, about 1.8, about 1.9, about 2.0, about 2.1, about 2.3, about 2.4, or about 2.5 times as large as a tear force in the longitudinal direction. In certain embodiments of the presently-disclosed thermoplastic films, the thermoplastic films comprise a tear force in the longitudinal direction that is about 1.5 times as large as a tear force in the longitudinal direction.

In addition to producing thermoplastic films having asymmetric tear properties, in some embodiments, one or more materials can also be added to one or more of the layers of the thermoplastic film to produce a thermoplastic film or layer thereof having a desired dynamic coefficient of friction. As used herein, dynamic coefficient of friction refers to the coefficient of friction which persists during a sliding motion at a given speed. The coefficient of friction is determined as the ratio of the frictional force to the normal force, acting perpendicular to the two surfaces in contact. Methods for determining coefficients of friction can be found, for example, in International Organization for Standardization Standard ISO 8295 for Plastics Film and Sheeting, Determination of the Coefficients of Friction. For instance, in some embodiments, silica is added to a polyethylene terephthalate layer to achieve a desired dynamic coefficient of friction (COF) for a resulting film. In certain embodiments, a PET film is provided that includes a dynamic COF of about 0.45 μD or less, 0.35 μD or less, 0.25 μD or less, or 0.15 μD or less. Additionally, in certain embodiments, a film is provided that is configured to include a particular dynamic COF to steel when heated to 150° C., including, in some embodiments, a dynamic COF of about 0.45 μD or less, 0.35 μD or less, 0.25 μD or less, or 0.15 μD or less.

In some embodiments of the presently-described films and associated thermoplastic properties, and in addition to or as an alternative to including silica in one or more layers of the thermoplastic film, a coating is also applied to the film to impart one or more additional properties onto the film. For instance, in some embodiments, a coating can be applied to the film after the step of stretching the multilayer film in a longitudinal direction, but prior to the step of stretching the multilayer film in the transverse direction. In some embodiments, the step of coating the film comprises coating at least one side of the film with a coating selected from the group consisting of an acrylic coating, a polyurethane coating, a polysulphonester coating, and a quaternary ammonium-based coating.

In some embodiments, the step of coating the film comprises coating the film with an acrylic primer, which, in certain embodiments, can then form a cross-linked acrylic primer layer on the film. Such an acrylic primer layer is typically highly cross-linked and capable of providing a relatively low dynamic COF to metal to increase the contact of film to metal. In some embodiments, the dynamic COF of the acrylic layer of the film to the metal is about 0.15 to about 0.45 μD when heated to 150° C. In some embodiments, the dynamic COF of the acrylic layer of the film to the metal is about 0.15 μD, about 0.20 μD, about 0.25 μD, about 0.30 μD, about 0.35 μD, about 0.40 μD, or about 0.45 μD. In some embodiments, the dynamic COF of the acrylic layer of the film to the metal is less than about 0.45 μD when heated to 150° C. In some embodiments, the dynamic COF of the acrylic layer of the film to the metal is less than about 0.20 μD when heated to 150° C.

In some embodiments, to produce an acrylic primer layer having such properties, the acrylic primer layer can be comprised of an acrylic resin that adheres well to a polyethylene terephthalate layer. Such acrylic resins can be selected from resins having a monomer component such as, for example, an alkyl acrylate, an alkyl methacrylate, (examples of such alkyl groups include a methyl group, an ethyl group, an n-propyl group, an isopropyl group, an n-butyl group, an isobutyl group, a t-butyl group, a 2-ethylhexyl group, a lauryl group, a stearyl group, a cyclohexyl group, a phenyl group, a benzyl group, a phenylethyl group and the like), a monomer having a hydroxyl group such as 2-hydroxyethyl acrylate, 2-hydroxyethyl methacrylate, 2-hydroxypropyl acrylate, 2-hydroxypropyl methacrylate or the like, a monomer having an amide group such as acrylamide, methacrylamide, N-methyl acrylamide, N-methyl methacrylamide, N-methylol acrylamide, N-methylol methacrylamide, N,N-dimethylol acrylamide, N-methoxymethyl acrylamide, N-methoxymethylmethacrylamide, N-phenyl acrylamide or the like, a monomer having an amino group such as N,N-diethylamino ethyl acrylate, N,N-diethylamino ethyl methacrylate or the like, a monomer having an epoxy group such as glycidyl acrylate, glycidyl methacrylate or the like, a monomer having a carboxylic acid or a salt thereof such as acrylic acid, methacrylic acid or a salt thereof (an alkali metal salt, an alkali earth metal salt, an ammonium salt or the like) and the like whereupon one or more types of such monomer components are copolymerized. In some embodiments, the acrylic primer is comprised of a copolymer of methyl methacrylate that further includes methacrylic acid and methacrylonitrile. In some embodiments, the acrylic primer is comprised of a co-polymer of methylmethacrylate, butylacrylate, methacrylic acid, methyl acrylate, acrylic acid, and hydroxyethylmethacrylate, alone or in combination with other monomers, as such a combination of monomers has been observed to produce an acrylic primer layer having sufficient hardness and COF values as well as a sufficient ability to adhere to down-stream sealants including, but not limited to, polyethylene, ethylene vinyl acetate, ethylene methyl acrylate, and copolymers and terpolymers thereof.

In addition to the acrylic components of the acrylic primer layer, one or more cross-linking agents can also be included in the acrylic primer layer to harden the acrylic primer layer, to reinforce the bonding between the various layers of the thermoplastic film, and to also provide a highly cross-linked layer capable of providing increased thermal resistance. Exemplary cross-linking agents that can be used with the acrylic components include, but are not limited to, melamine-based cross-linkers, epoxy-based cross-linkers, aziridine-based cross-linkers, epoxyamide compounds, titanate-based coupling agents (e.g., titanium chelate), oxazoline-based cross-linkers, isocyanate-based cross-linkers, methylolurea or alkylolurea-based cross-linkers, aldehyde-based cross-linkers, and acrylamide-based cross-linkers. In some embodiments, the cross-linking agent is selected from melamine, epoxy-based cross-linkers, and aldehyde-based cross-linkers.

In some embodiments, the cross-linking agents are included in the acrylic primer layer to produce a cross-linked acrylic primer layer having a cross-linking density of about 10%, about 15%, about 20%, about 25%, about 30%, or about 40%. In some embodiments, the cross-linking agents are included in the acrylic primer layer to produce a cross-linked acrylic primer layer having a cross-linking density of greater than about 10%.

The acrylic primer layer can be applied to the film by a number of methods, including application of the acrylic primer in a dispersion or solution of water, and by an application method such as gravure coating, meyer rod coating, slot die, knife over roll, or any variation of roll coating. In some embodiments, the acrylic primer layer is applied by inline coating, whereby the acrylic primer layer is applied to the film as it is being produced. More specifically, and as described above, the acrylic primer layer can be applied to both sides of the film by inline coating immediately after stretching the film in the longitudinal direction. In some embodiments, the thickness of the acrylic primer layer that is applied to at least one side of the film is about 0.3 µm, about 0.25 µm, about 0.2 µm, about 0.15 µm, about 0.10 µm, or about 0.05 µm.

The presently-disclosed subject matter is further illustrated by the following specific but non-limiting examples.

EXAMPLES

Example 1—Thermoplastic Polyethylene Terephthalate (PET) Film

A polyethylene terephthalate film was prepared in a conventional sequential biaxial orientation machine. The machine consisted of a single screw mainline extrusion train and a twin screw sub extrusion process. Briefly, polyethylene terephthalate pellets of an intrinsic viscosity (IV) of 0.62 were fed into the main extrusion train at a rate of 650 Kg/hr. Into the sub-extrusion process, a blend of 0.62 IV polyethylene terephthalate pellets (75%) and silica filled polyethylene terephthalate pellets (25%) were fed into the system. The amount of silica used was optimized to produce a COF of less than 0.45 µD at the end of the film making process.

These materials were then separately melted and laminated together in a feed-block to produce an A/B/A molten structure in the extrusion die.

The molten laminated polyethylene terephthalate material that emerged from the extrusion die was subsequently quenched on a chilled casting drum to produce a thick, amorphous film structure. Subsequently, this film was stretched in the longitudinal, or machine or lengthwise, direction through a heated roller assembly. The ratio of this stretching was varied. After longitudinal stretching, the film was then stretched in the transverse direction.

More specifically, the film was stretched in the longitudinal direction by a factor of 3.5. The film was then attached to a chain rail and entered a tenter for transverse orientation by a factor of about 4.1. The temperature at which the transverse orientation was performed varied from standard procedures, and Table 1 shows the temperatures of the transverse orientation at different locations.

TABLE 1

Transverse Orientation Temperatures at Various Locations

| Location | Temp. (° C.) |
| --- | --- |
| Pre-Heat Zone | |
| PH1 | 85-100 |
| PH2 | 85-100 |
| PH3 | 85-100 |
| Stretch Zone | |
| ST1 | 90-100 |
| ST2 | 90-100 |
| ST3 | 90-100 |
| ST4 | 90-100 |
| ST5 | 90-100 |
| Crystallization Zone | |
| CX1 | 80-90 |
| CX2 | 80-90 |
| CX3 | 80-90 |
| CX4 | 80-90 |
| CX5 | 80-90 |
| Anneal Zone | |
| AZ | 80-90 |
| Cooling Zone | |
| C-1 | 70-90 |
| C-2 | 40-60 |

The resulting film had a thickness of about 12 µm. Additionally, the films included a tensile strength in the longitudinal and transverse directions of about 2000 kg/cm$^2$ and 3000 kg/cm$^2$, respectively and, in some instances, higher tensile strength values.

Example 2—Comparative Control Polyethylene Terephthalate (PET) Film

A control film was prepared for comparison to the film described in Example 1. Using the procedures described in Example 1, a polyethylene terephthalate layer was laminated on both sides of a polyethylene terephthalate-silica layer to produce an A/B/A molten structure in the extrusion die.

The molten laminated polyethylene terephthalate material was subsequently quenched on a chilled casting drum, and then the control film was stretched in longitudinal direction through a heated roller assembly by a factor of 3.4. Next, without coating the film, the film was side-ways drawn at a stretch ratio of approximately 4.0 in the transverse direction.

The temperature at which the transverse orientation was performed varied, and Table 2 shows the temperatures of the transverse orientation at different locations. The resulting film was about 12 μm thick.

TABLE 2

Transverse Orientation Temperatures at Various Locations

| Location | Temperature |
|---|---|
| Pre-Heat Zone | |
| PH1 | 98 |
| PH2 | 100 |
| PH3 | 101 |
| Stretch zone | |
| S1 | 102 |
| S2 | 106 |
| S3 | 107 |
| S4 | 109 |
| Neutral Zone - N1 | |
| Crystallization Zone | |
| CX1 | 180 |
| CX2 | 226 |
| CX3 | 226 |
| CX4 | 226 |
| Neutral Zone - N2 | |
| Anneal Zone | |
| AZ1 | 180 |
| Neutral Zone - N3 | |
| Cooling Zone | |
| C-1 | 66 |
| C-2 | 38 |

Example 3—Comparison of Films

Figure 1:
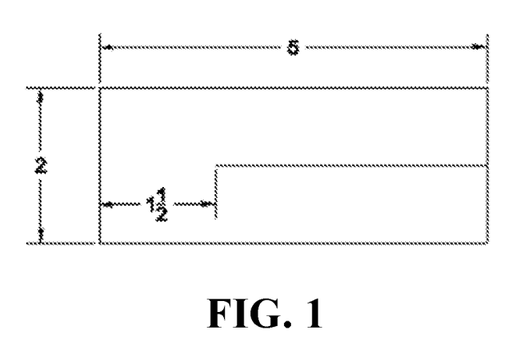
FIG. 1 is a schematic diagram showing an initial 3.5 inch tear formed in a polyethylene terephthalate film made in accordance with the presently-disclosed subject matter.

This Example describes a process for analyzing the longitudinal and transverse tear properties of the films produced in Examples 1 and 2. First, both sets of films were provided, and 2 inch×5 inch samples of the films were cut in both the longitudinal direction and the transverse directions. Five samples were cut in each direction and for each film, which produced a total of 20 samples. As shown in FIG. 1, each of the samples were then cut 3.5 inches from the center of one of the 2 inch sides, leaving a 1.5 inch tail from the other end of the sample that was still attached.

Next, an Instron Tensile Tester (Instron, Norwood, Mass.) was provided, and was configured such that it would record and report total work and displacement for each trial. The Tensile Tester was also configured such that it registered a "break" and stopped recording once the tear reached the edge of the respective samples.

Figure 2A:
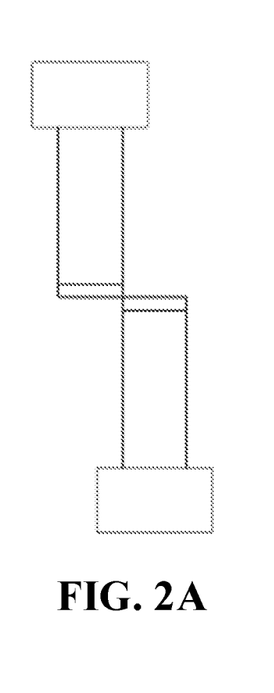
FIG. 2A is a schematic diagram showing the polyethylene terephthalate film sample of FIG. 1 inserted in a Tensile Tester.
Figure 2B:
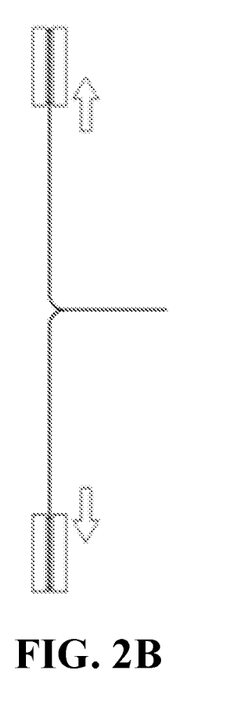
FIG. 2B is another schematic diagram showing the polyethylene terephthalate film of FIG. 1 inserted in a Tensile Tester.

As shown in FIG. 2A, the samples were inserted into the Tensile Tester so that the tear was oriented vertically. Specifically, one free end of the sample where the tear had initiated was attached to the top clamp, then, while applying light tension, the other free end of the sample where the tear had initiated was attached to the bottom clamp. As shown in FIG. 2B, the remaining 1.5" long tail portion of the sample was kept straight and perpendicular to the direction of the tear. Without being bound by theory or mechanism, keeping the tail portion straight and horizontal avoided force magnification, and the sample was also held so as to avoid pulling on the upper "leg" when inserting the sample into the Tensile Tester.

The tear properties were then evaluated by recording the total work (Nmm) and displacement (mm) required to tear the 1.5" tail portions. Table 3 shows the displacement, work, and average force values calculated for the five longitudinal direction (LD) and the five transverse direction (TD) samples of the asymmetric film. The results show that the film was more resistant to tearing in the longitudinal direction in comparison to the transverse direction.

TABLE 3

| | Displacement | Work | Average force (Newton) |
|---|---|---|---|
| LD 1 | 62.164 | 2.743 | 0.044 |
| LD 2 | 60.571 | 2.911 | 0.048 |
| LD 3 | 61.019 | 2.237 | 0.037 |
| LD 4 | 59.391 | 2.346 | 0.039 |
| LD 5 | 60.508 | 2.241 | 0.037 |
| LD Avg | 60.731 | 2.496 | 0.041 |
| Sigma | 0.895 | 0.278 | 0.004 |
| TD 1 | 60.938 | 1.656 | 0.027 |
| TD 2 | 64.247 | 2.823 | 0.044 |
| TD 3 | 60.701 | 1.646 | 0.027 |
| TD 4 | 61.274 | 1.800 | 0.029 |
| TD 5 | 62.735 | 1.492 | 0.024 |
| TD Avg | 61.979 | 1.883 | 0.030 |
| Sigma | 1.336 | 0.480 | 0.007 |

On the other hand, the control film exhibited tear properties in the transverse direction that were similar to the tear properties in the longitudinal direction. The tear properties of the control film in both the transverse direction and longitudinal direction were also found to be similar to a similar commercially-obtained biaxially-oriented PET film that, like the control film, exhibited significantly different properties when compared to the PET film of the present invention having asymmetric tear properties (Table 4).

TABLE 4

| Sample | Orientation | Tear Force 1 | Tear Force 2 | Tear Force 3 | Average (Newton) |
|---|---|---|---|---|---|
| Control 1 | LD | 0.079 | 0.066 | 0.063 | 0.069 |
| Control 1 | TD | 0.084 | 0.080 | 0.054 | 0.062 |
| Competitive Sample | LD | 0.065 | 0.070 | 0.061 | 0.065 |
| Competitive Sample | TD | 0.078 | 0.055 | 0.054 | 0.062 |

Throughout this document, various references are mentioned. All such references are incorporated herein by reference, including the references set forth in the following list:

REFERENCES

1. "The Effect of Stretching Conditions on Properties of Amorphous Polyethylene Terephthalate Film" S. K. Sharma and A. Misra *J. Applied Polymer Science Vol.* 34 2231-2247 1987.
2. U.S. Patent Application No. 2011/0028677, to Mohanti, et al., filed Dec. 17, 2008, and entitled "Biaxial Oriented Polyester Film and a Process for Preparing Same."
3. U.S. Pat. No. 3,579,609, to Sevenich, issued May 18, 1971, and entitled "Flex-Resistant Polyester film Containing Olefin or Polytetramethylene Oxide Additive Polymer."
4. U.S. Pat. No. 3,944,699, to Mathews, et al., issued Mar. 16, 1976, and entitled "Opaque Molecularly Oriented and Heat Set Linear Polyester Film and Process for Making Same."

5. U.S. Pat. No. 3,640,944, to Benz, et al., issued Feb. 8, 1972, and entitled "Modified Polyester Film for Punched Tapes."
6. U.S. Pat. No. 6,984,322, to Suh, et al., issued Jan. 10, 2006, and entitled "Voided Polyester Film."
7. U.S. Pat. No. 8,236,399, to Chicarella, et al., issued Aug. 7, 2012, and entitled "Lighter than Air Balloon Made from Biaxially-oriented Polyester Film."
8. U.S. Pat. No. 8,399,080, to Chicarella, et al., issued Mar. 19, 2013, and entitled "Lighter than Air Balloon Made from Biaxially-oriented Polyester Film."

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A thermoplastic film, comprising:
    a biaxially-oriented polyethylene terephthalate (PET) layer;
    an acrylic primer layer on at least one side of the film, wherein the acrylic primer layer comprises cross-linking agents;
    a tensile strength in the longitudinal direction of about 2000 kg/cm$^2$ or more;
    a tensile strength in the transverse direction of about 3000 kg/cm$^2$ or more;
    a crystallinity in the transverse direction that is reduced as compared to a crystallinity in the longitudinal direction; and
    a tear force in the longitudinal direction that is about 1.5 times as large as a tear force in the transverse direction;
    wherein the polyethylene terephthalate layer comprises a polyethylene terephthalate homopolymer.

2. The film of claim 1, wherein the polyethylene terephthalate layer further comprises a polyethylene terephthalate copolymer.

3. The film of claim 1, further comprising a coating on at least one side of the film, the coating selected from the group consisting of an acrylic coating, a polyurethane coating, a polysulphonester coating, and a quaternary ammonium-based coating.

4. The film of claim 1, wherein the film comprises two or more layers.

5. The film of claim 4, wherein the film consists essentially of three layers.

6. The film of claim 4, wherein one or more of the layers includes silica.

7. The film of claim 6, wherein the one or more layers that include silica have a dynamic coefficient of friction to steel of about 0.45 or less.

8. The film of claim 6, wherein the layer that includes silica is comprised of polyethylene terephthalate.

9. The film of claim 6, wherein the layer that includes silica is interposed between layers that do not include silica.

10. The film of claim 6, wherein the film comprises, from top to bottom, a first polyethylene terephthalate layer, a polyethylene terephthalate-silica layer, and a second polyethylene terephthalate layer.

11. The film of claim 1, wherein the one or more layers that include silica have a dynamic coefficient of friction to steel of about 0.45 or less when heated to 150° C.

12. The film of claim 1, wherein the film has a total thickness of about 50 μm or less.

13. The film of claim 1, wherein the film has a total thickness of about 30 μm or less.

14. The film of claim 1, wherein the film has a total thickness of about 5 μm to about 15 μm.

15. A process for producing the thermoplastic film of claim 6, comprising:
    producing a biaxially-oriented polyethylene terephthalate (PET) layer which comprises a polyethylene terephthalate homopolymer;
    producing a biaxially-oriented polyethylene terephthalate layer that includes silica (PET-silica);
    laminating the polyethylene terephthalate layer on one or both sides of the polyethylene terephthalate-silica layer to produce a multilayer film;
    applying an acrylic primer layer on at least one side of the film;
    stretching the multilayer film in a longitudinal direction; and
    stretching the multilayer film in a transverse direction.

16. The process of claim 15, wherein the step of stretching the multilayer film in the longitudinal direction includes stretching the multilayer film by a factor of about 2 to about 4.

17. The process of claim 15, wherein the step of stretching the multilayer film in the transverse direction includes stretching the multilayer film by a factor of about 3 to about 4.5.

18. The process of claim 15, wherein the step of stretching the multilayer film in the transverse direction is performed at a temperature of about 80° C. to about 140° C.

19. The process of claim 15, further comprising coating at least one side of the multilayer film after the step of stretching the multilayer film in a longitudinal direction and prior to the step of stretching the multilayer film in the transverse direction.

20. The process of claim 19, wherein coating the multilayer film comprises inline coating the multilayer film.

21. A thermoplastic film produced by the process according to claim 15.

* * * * *